United States Patent
Noda et al.

(10) Patent No.: US 11,952,747 B2
(45) Date of Patent: Apr. 9, 2024

(54) TELEOPERATION DEVICE FOR CONSTRUCTION MACHINERY

(71) Applicant: KOBELCO CONSTRUCTION MACHINERY CO., LTD., Hiroshima (JP)

(72) Inventors: Daisuke Noda, Hiroshima (JP); Koji Yamashita, Hiroshima (JP); Yoichiro Yamazaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 421 days.

(21) Appl. No.: 17/291,895

(22) PCT Filed: Nov. 1, 2019

(86) PCT No.: PCT/JP2019/043083
§ 371 (c)(1),
(2) Date: May 6, 2021

(87) PCT Pub. No.: WO2020/110605
PCT Pub. Date: Jun. 4, 2020

(65) Prior Publication Data
US 2022/0002968 A1     Jan. 6, 2022

(30) Foreign Application Priority Data
Nov. 30, 2018  (JP) .................................. 2018-224603

(51) Int. Cl.
*E02F 9/20*     (2006.01)
*E02F 9/26*     (2006.01)
*G05D 1/00*    (2006.01)

(52) U.S. Cl.
CPC ............. *E02F 9/205* (2013.01); *E02F 9/264* (2013.01); *G05D 1/0038* (2013.01); *G05D 1/005* (2013.01); *G05D 2201/0202* (2013.01)

(58) Field of Classification Search
CPC ........ E02F 9/205; E02F 9/264; G05D 1/0038; G05D 1/005; G05D 2201/0202; G08C 17/02; H04Q 2209/823; H04Q 9/00
See application file for complete search history.

(56) References Cited

U.S. PATENT DOCUMENTS

| | | | |
|---|---|---|---|
| 2014/0032058 A1* | 1/2014 | Stratton | E02F 9/261 701/50 |
| 2018/0178342 A1* | 6/2018 | Russell | G01C 9/04 |
| 2019/0113057 A1 | 4/2019 | Olsson | |

FOREIGN PATENT DOCUMENTS

| | | |
|---|---|---|
| CA | 2 390 363 A1 | 5/1999 |
| CN | 106643881 A * | 5/2017 |

(Continued)

OTHER PUBLICATIONS

International Search Report dated Jan. 21, 2020 in PCT/JP2019/043083 filed on Nov. 1, 2019, 2 pages.

(Continued)

*Primary Examiner* — Babar Sarwar
(74) *Attorney, Agent, or Firm* — Oblon, McClelland, Maier & Neustadt, L.L.P.

(57) ABSTRACT

A remote operation device includes: a vibration detector to detect a plurality of vibration components in a plurality of directions different from each other, the vibration components being included in a vibration caused on an attachment; a transmission device; and a transmission control section that controls an operation of the transmission device. A vibration determination condition is set in advance, the vibration determination condition including a condition that an amplitude of a maximum vibration component largest in (Continued)

amplitude among the plurality of vibration components detected by the vibration detector is equal to or larger than a preset amplitude threshold. The transmission control section controls the operation of the transmission device to allow the vibration information to be transmitted to an operator only when the vibration determination condition is met.

5 Claims, 8 Drawing Sheets

(56) References Cited

FOREIGN PATENT DOCUMENTS

| | | |
|---|---|---|
| CN | 108138459 A | 6/2018 |
| JP | 9-217382 A | 8/1997 |
| JP | 2001-173022 A | 6/2001 |
| JP | 2003-278159 A | 10/2003 |
| JP | 2013-168777 A | 8/2013 |
| JP | 2018-142123 A | 9/2018 |
| JP | 2019163602 A * | 9/2019 ............ B60W 50/16 |
| KR | 20100127963 A * | 10/2009 |
| KR | 10-2010-0127963 A | 12/2010 |
| KR | 10 2010 0127963 A | 12/2010 |
| WO | WO 2017/213571 A1 | 12/2017 |
| WO | WO-2017213571 A1 * | 12/2017 ............. E02F 3/963 |
| WO | WO-2018115212 A1 * | 6/2018 ............... B60Q 9/00 |

OTHER PUBLICATIONS

Combined Chinese Office Action and Search Report dated Feb. 16, 2022 in Chinese Patent Application No. 201980068543.8 (with unedited computer generated Engiish translation), 10 pages.
Extended European Search Report dated Dec. 9, 2021 in European Patent Application No. 19888518.8, 9 pages.

* cited by examiner

FIRST COORDINATE SYSTEM

SECOND COORDINATE SYSTEM

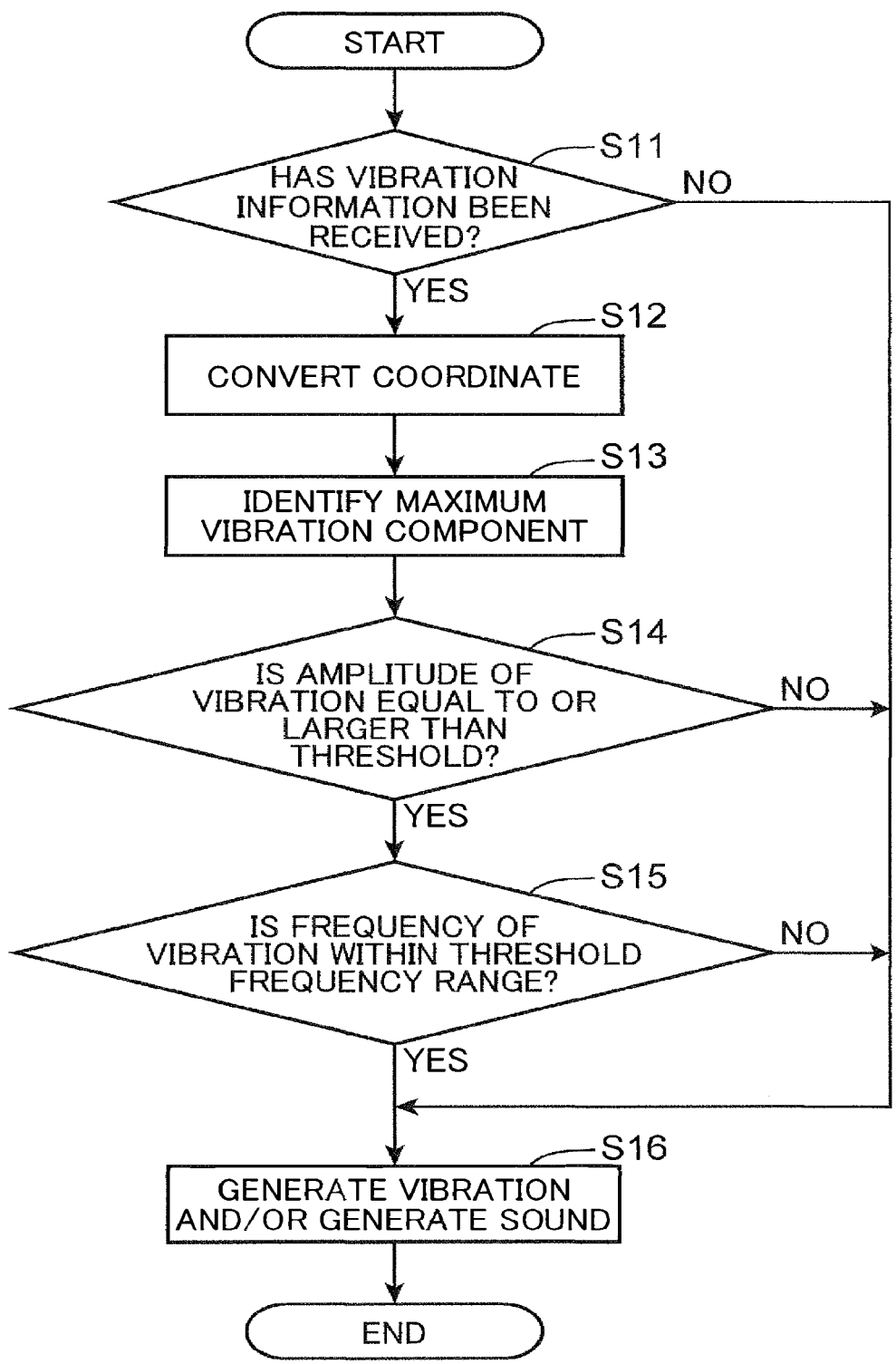

TELEOPERATION DEVICE FOR CONSTRUCTION MACHINERY

TECHNICAL FIELD

The present invention relates to a remote operation device for remotely operating a construction machine from a remote place distant from the construction machine.

BACKGROUND ART

A construction machine used for various types of work, such as excavation work and demolition work, has been known for years. An operator who operates the construction machine from an operator's seat in a cab, especially an operator skilled in operating the construction machine, determines whether an attachment has come in contact with a different object, such as a work target, referring not only to visually acquired information but also to information on vibrations transmitted to the operator sitting in the operator's seat in the cab. Such information the operator refers to includes, for example, information on vibrations that are caused when a bucket of the attachment comes in contact with earth and sand, which is an excavation target, during the excavation work, and information on vibrations that are caused when a crusher of the attachment comes in contact with a construction, which is a crushing target, during the demolition work.

Recently, a technique has been proposed, according to which an operator operates a remote operation lever in a remote place distant from a construction machine, thereby remotely operating the construction machine. In such work involving remote operation, information indicating that the attachment of the construction machine has come in contact with the work target is information essential to execution of work involving remote operation.

Patent Literature 1 discloses a remote operation system in which a work machine is provided with a vibration detection sensor and the vibration detection sensor detects vibrations caused by work that work unit performs. According to the remote operation system, an operator's seat is provided with a vibration generation device. A detection signal detected by the vibration detection sensor is wirelessly transmitted to this vibration generation device. Upon receiving the incoming detection signal from the vibration detection sensor, the vibration generation device applies a vibration to the operator's seat.

Patent Literature 2 discloses a remote operation excavator in which a work force (an excavating force and a torsion) of a hydraulic excavator is detected by a work force detector and the detected work force is transmitted to a remote operation device in a remote place, via an antenna. According to the remote operation excavator, a controller converts the excavating force and the torsion into two sinusoidal amplitudes and outputs the sinusoidal amplitudes to a vibration synthesizer, which constructs sine waves from the incoming sinusoidal amplitudes and outputs the sine waves to a vibration generation device. The vibration generation device then vertically vibrates a seat, in which an operator is sitting, according to the sine wave based on the excavating force while vibrating the seat in the direction of its rotation according to the sine wave based on the torsion.

However, vibrations caused on an attachment during the excavation work or demolition work using a construction machine include not only the vibration that is caused when the attachment comes in contact with a work target but also a vibration that originates from a machine body, such as a lower travelling body and an upper stewing body, that is, a vibration that is caused when the attachment makes no contact with the work target. According to the techniques disclosed in Patent Literatures 1 and 2, signals on vibrations from a sensor is transmitted to a remote place, where the vibration generation device applies vibrations to the operator's seat, based on the incoming signals, without making signal selection. Vibrations applied to the operator's seat in the remote place by the remote operation devices according to Patent Literatures 1 and 2, therefore, include various types of vibrations different from the vibration that is caused when the attachment comes in contact with the work target. It is thus difficult for the operator in the remote place to determine whether the attachment has come in contact with the work target, based on the vibrations applied to the operator's seat in the remote place.

CITATION LIST

Patent Literature

Patent Literature 1: JP 2013-168777 A
Patent Literature 2: JP 119-217382 A

SUMMARY OF INVENTION

An object of the present invention is to provide a remote operation device for a construction machine, the remote operation device capable of determining whether a vibration caused on an attachment when remotely operating the construction machine is a vibration having a high possibility of the attachment coming in contact with a different object, and when determining that such a vibration has been caused, selectively transmitting the vibration to an operator in a remote place.

Provided is a remote operation device for remotely operating a construction machine having an attachment from a remote place distant from the construction machine. The remote operation device includes: a vibration detector configured to detect a plurality of vibration components in a plurality of directions different from each other, the vibration components being included in a vibration caused on the attachment; a transmission device that transmits vibration information on the vibration of the attachment to an operator in the remote place; and a transmission control section that controls an operation of the transmission device. A vibration determination condition for determining whether the vibration of the attachment is a vibration caused by the attachment's coming in contact with a different object is set in advance, the vibration determination condition includes a condition that an amplitude of a maximum vibration component largest in amplitude among the plurality of vibration components detected by the vibration detector is equal to or larger than a preset amplitude threshold, and the transmission control section controls an operation of the transmission device to allow the vibration information to be transmitted to the operator only when the vibration determination condition is met.

BRIEF DESCRIPTION OF DRAWINGS

FIG. 8 is a flowchart showing an example of a calculation control processing carried out by a remote place controller disposed in a remote place, the remote place controller being included in the controller of the remote operation device.

DESCRIPTION OF EMBODIMENTS

Preferred embodiments of the present invention will hereinafter be described with reference to the drawings.

Figure 1:
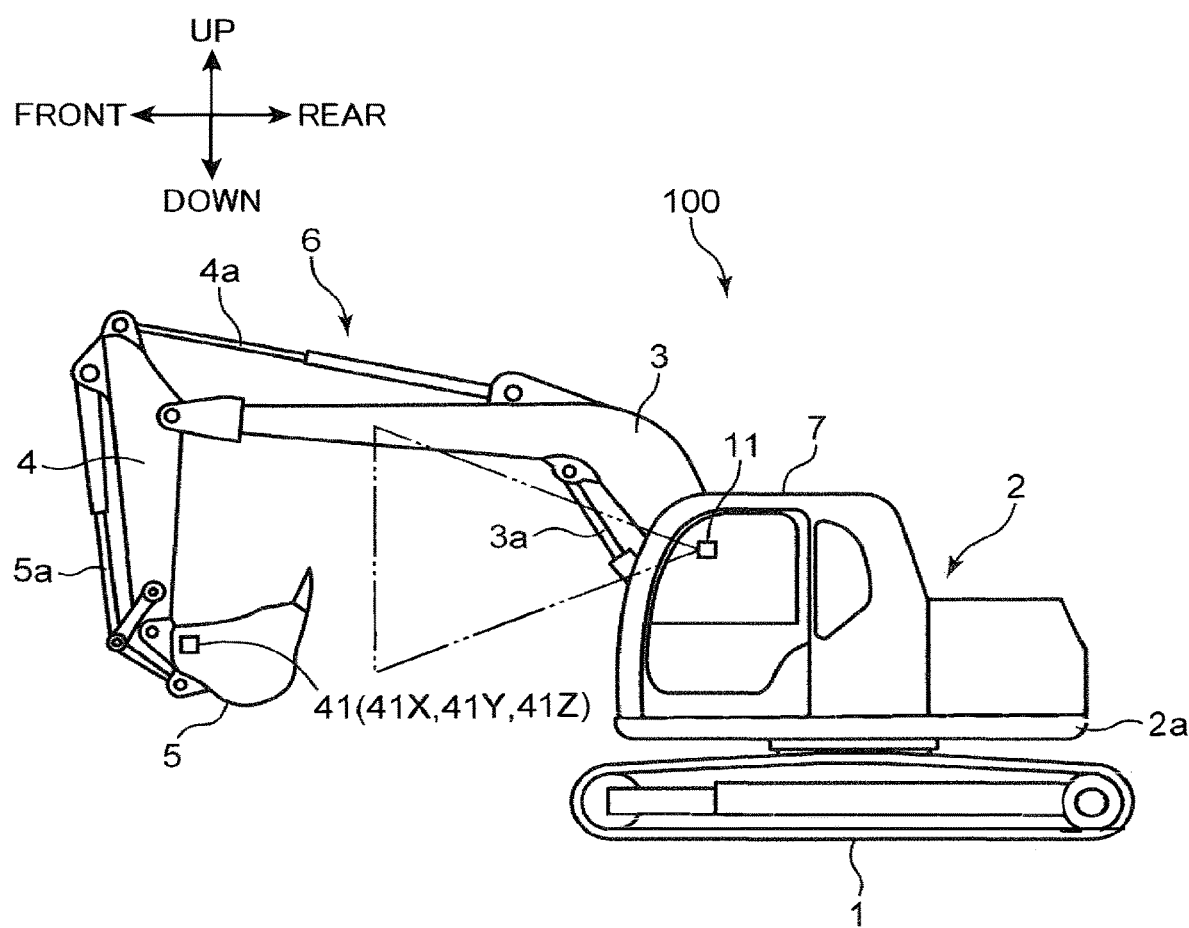
FIG. 1 is a side view of an example of a construction machine remotely operated by a remote operation device according to an embodiment of the present invention.
Figure 2:
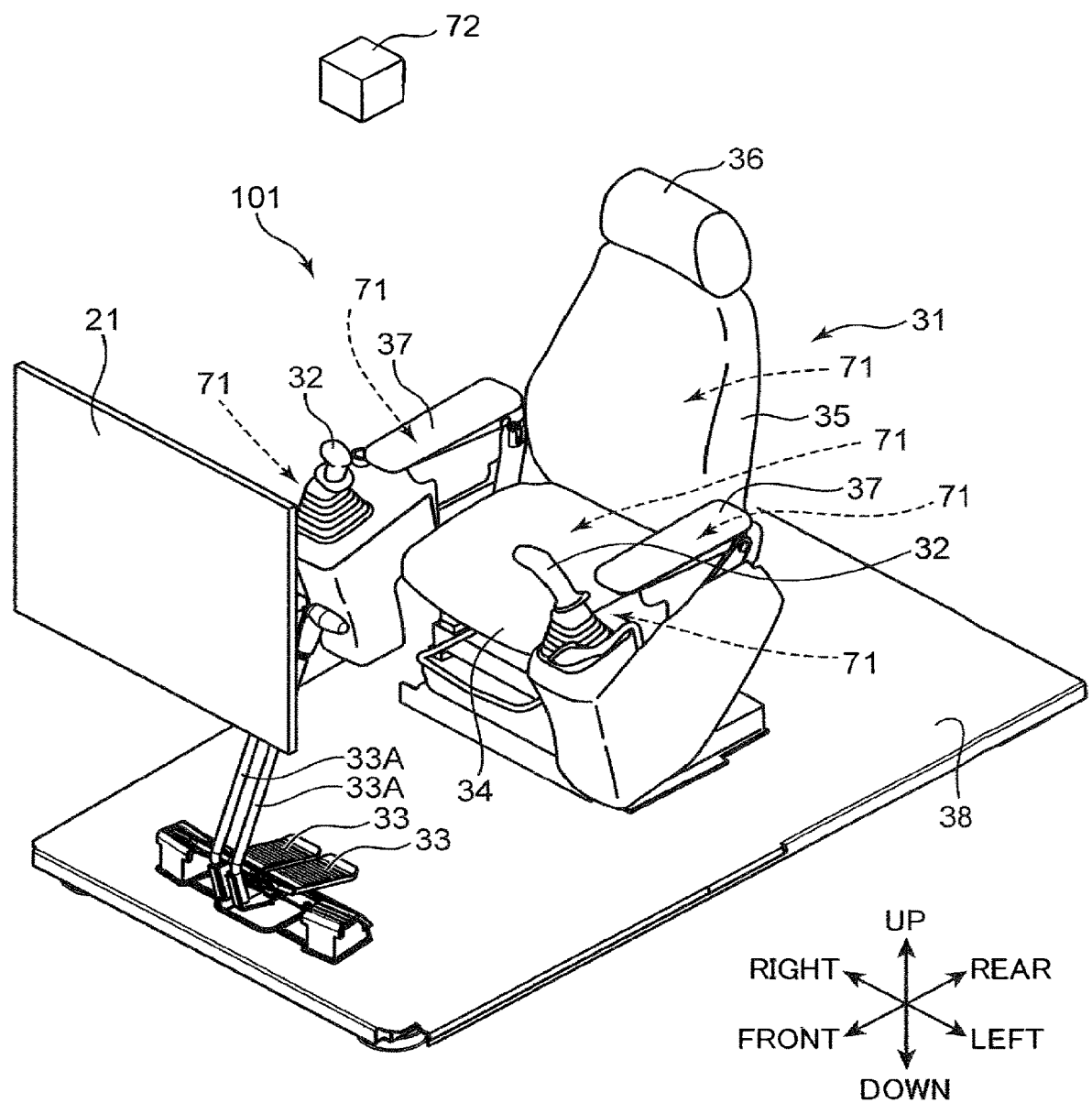
FIG. 2 is a perspective view of an operator's seat, remote operation levers, and a transmission device of the remote operation device according to the embodiment.
Figure 3:
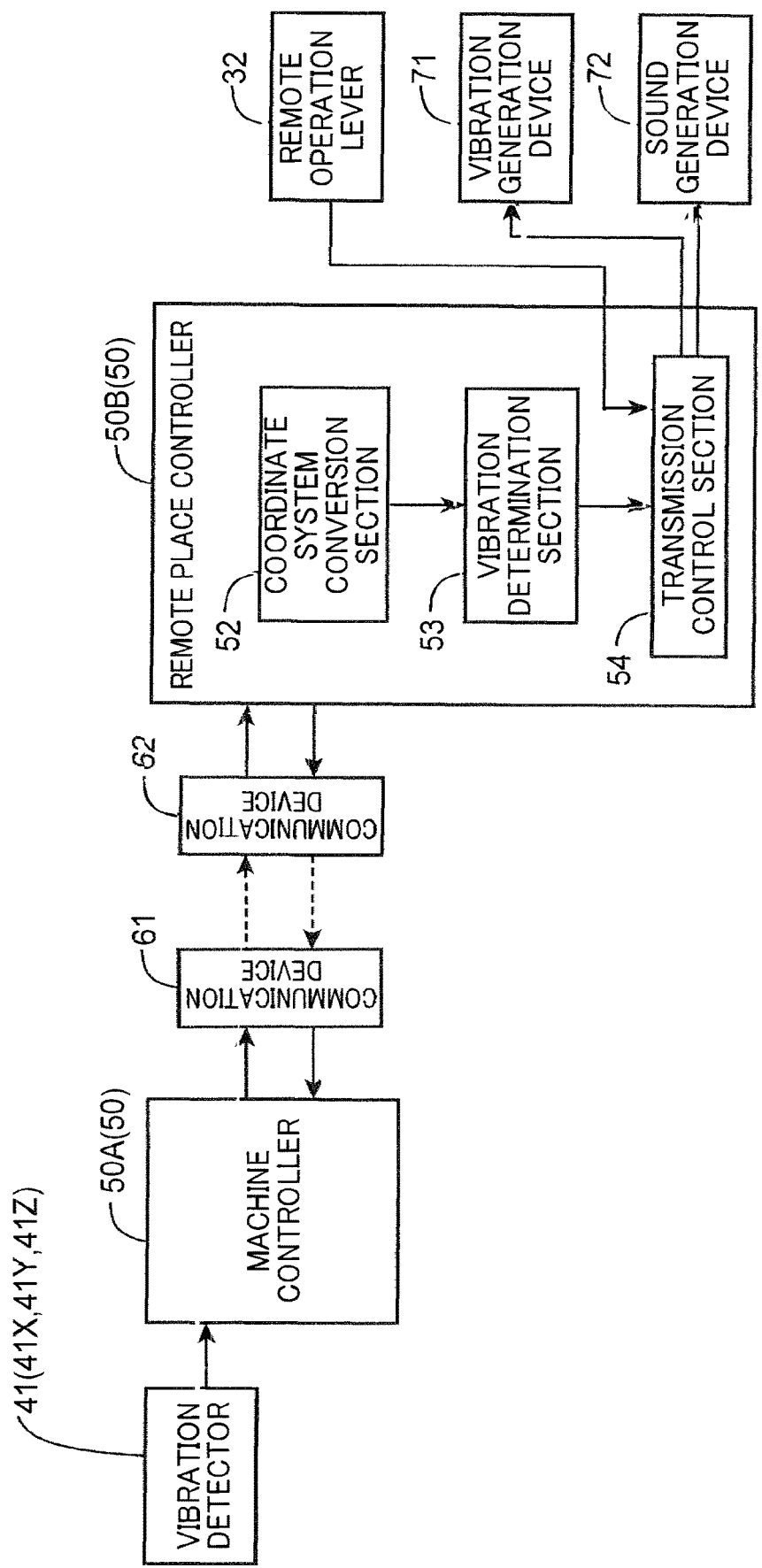
FIG. 3 is a block diagram showing a functional configuration of the remote operation device according to the embodiment.

FIG. 1 is a side view of a hydraulic excavator 100 that is an example of a construction machine remotely operated by a remote operation device 101 according to an embodiment of the present invention. FIG. 2 is a perspective view of an operator's seat 31, remote operation levers 32, and transmission devices 71 and 72 of the remote operation device 101 according to the embodiment. FIG. 3 is a block diagram showing a functional configuration of the remote operation device 101. The hydraulic excavator 100 (construction machine) and the remote operation device 101 make up a remote operation system.

In FIGS. 1 and 2, directions are indicated as "up", "down", "left", "right", "front", and "rear". These directions are indicated to facilitate description of respective structures of the remote operation device 101 and the hydraulic excavator 100 according to the embodiment of the present invention, and do not set a limit to movement directions of the hydraulic excavator 100 or forms of using the same.

As shown in FIG. 1, the hydraulic excavator 100 includes a lower travelling body 1, an upper slewing body 2 slewably mounted on the lower travelling body 1, and an attachment 6 attached to the upper slewing body 2. The upper slewing body 2 has a slewing frame 2a coupled to the lower travelling body 1, and a cab 7 mounted on the slewing frame 2a. The attachment 6 includes a boom 3 coupled to a front end of the slewing frame 2a so as to be able to rise and fall, an arm 4 turnably coupled to a tip of the boom 3, and a tip attachment 5 turnably coupled to a tip of the arm 4. According to this embodiment, the tip attachment 5 is a bucket 5. The cab 7 is mounted on a front part of the slewing frame 2a, where the cab 7 is located adjacent to the boom 3 in the left-to-right direction of the slewing frame 2a. The cab 7 is an operator's cab in which an operator operates the hydraulic excavator.

The hydraulic excavator 100 further includes a plurality of hydraulic actuators 3a, 4a, and 5a that cause the attachment 6 to move, a slewing motor (not illustrated) that causes the upper slewing body 2 to slew, and a travelling motor (not illustrated) that causes the lower travelling body 1 to travel. The plurality of hydraulic actuators include a boom cylinder 3a that causes the boom 3 to move, an arm cylinder 4a that causes the arm 4 to move, and a bucket cylinder 5a that causes the bucket 5 to move.

The remote operation device 101 according to this embodiment is a device for remotely operating the hydraulic excavator 100 from a remote place distant from the hydraulic excavator 100. According to the embodiment illustrated in FIGS. 1 to 3, the remote operation device 101 includes a camera 11 (image acquiring device), a display device 21, the operator's seat 31, a pair of the remote operation levers 32 and 32, a pair of travelling pedals 33 and 33, a pair of travelling levers 33A and 33A, a vibration detector 41, a controller 50, communication devices 61 and 62, a vibration generation device 71 (an example of a transmission device), and a sound generation device 72 (another example of the transmission device). A machine controller 50A disposed on the hydraulic excavator 100 and a remote place controller 50B disposed in a remote place make up the controller 50.

The camera 11, the vibration detector 41, the machine controller 50A, and the communication device 61 are disposed on the hydraulic excavator 100 of FIG. 1 or in the vicinity thereof. The display device 21, the operator's seat 31, the pair of remote operation levers 32 and 32, the pair of travelling pedals 33 and 33, the pair of travelling levers 33A and 33A, the remote place controller 50B, the vibration generation device 71, the sound generation device 72, and the communication device 62 are disposed in a remote place shown in FIG. 2, which is distant from the hydraulic excavator 100.

The camera 11 is a device that can capture images. Specifically, the camera 11 can capture moving images. The camera 11 has a given viewing angle (e.g., a viewing angle indicated by a two-dot chain line in FIG. 1) and is configured to capture an image in a range defined by the given viewing angle. Information on an image acquired by the camera 11 (an image signal) is input to the remote place controller 50B disposed in the remote place, via the communication devices 61 and 62 shown in FIG. 3.

As shown in FIG. 1, the camera 11 acquires an image (work image) that is an image of a work area of the hydraulic excavator 100 and that corresponds to a visual field of the operator sitting in a seat in the operator's cab, i.e., the cab 7. The camera 11 is set, for example, at a position corresponding in height to the eyes of the operator sitting in the seat in the operator's cab, i.e., the cab 7, and has a forwardly expanding visual field so as to be able to capture an image of a principle part of the attachment 6, such as the arm 4 and the bucket 5.

The display device 21 is a device that in the remote place, displays an image acquired by the camera 11. The display device 21 receives information on an image (image signal), which is input to the remote place controller 50B via the communication devices 61 and 62, and displays the image. As shown in FIG. 2, the display device 21 may be provided as a display, such as a liquid crystal display and an organic electroluminescence display. In such a case, the display device 21 is disposed at a position that allows the operator sitting in the operator's seat 31 to observe an image displayed on the display device 21. The display device 21 is not limited to such a display as described above, and may be provided, for example, as a projector or the like (not illustrated) that projects an image onto a screen or the like or as a head mount display (not illustrated) fitted on the operator's head.

The operator's seat 31 is a seat n which the operator sits in the remote place. The operator's seat 31 includes a seat 34, a backrest 35, a headrest 36, and left and right armrests 37 and 37. The seat 34 supports the lower half of the operator's body, specifically, the buttocks and a part of the legs (thighs). The backrest 35 supports the upper half of the operator's body, specifically, the back. The headrest 36 supports the operator's head, specifically, the back of the head.

The left and right armrests 37 and 37 support the operator's forearms when the operator, who is sitting in the operator's seat 31, operates the remote operation levers 32 and 32. The left and right armrests 37 and 37 each have a longitudinally elongated shape so as to be able to support the operator's forearm. The left and right armrests 37 and 37 are arranged respectively on the left side and the right side of the seat 34.

When an attachment operation is applied to each of the pair of remote operation levers 32 and 32 by the operator sitting in the operator's seat 31 in the remote place, the remote operation lever turns forward, backward, left, or right. This attachment operation is an operation for causing the attachment 6 to move. Attachment operations include a boom rising and falling operation for causing the boom 3 to make a rising and falling movement relative to the upper slewing body 2, an arm turning operation for causing the arm 4 to make a turning movement relative to the boom 3, a bucket turning operation for causing the bucket 5 to make a turning movement relative to the arm 4, and an attachment slewing operation for causing the upper slewing body 2 to make a slewing movement relative to the lower travelling body 1, thereby causing the attachment 6 to slew.

The pair of travelling pedals 33 and 33 are pedals for causing the lower travelling body 1 to travel. The pair of travelling levers 33A and 33A are levers for causing the lower travelling body 1 to travel. The operator sitting in the operator's seat 31 steps on the left and right travelling pedals 33 and 33 located in front of the operator's seat 31, or operates the left and right travelling levers 33A and 33A, thereby causing the lower travelling body 1 to travel. This means that an operation for causing the lower travelling body 1 to travel is carried out as an operation of stepping on the travelling pedals 33 and 33 and as an operation of manually manipulating the travelling levers 33A and 33A as well.

When an operation is applied to each remote operation lever 32 by the operator, each remote operation lever 32 generates an operation signal corresponding to a state of the remote operation lever 32 (operation state), the state being determined according to an operation amount, an operation direction, and the like of the operation, and inputs the operation signal to the remote place controller 50B. Specifically, the operation state of each remote operation lever 32, the operation state being determined according to the operation amount, the operation direction, and the like, is converted to an electric signal (operation signal), which is input to the remote place controller 50B. Likewise, when an operation is applied to each travelling pedal 33 or each travelling lever 33A by the operator, each travelling pedal 33 or each travelling lever 33A generates an operation signal corresponding to an operation amount of the operation, and inputs the operation signal to the remote place controller 50B. Each remote operation lever 32 includes a lever body to which an operation is applied by the operator, and an operation signal generating part that generates an operation signal corresponding to an operation amount, an operation direction, and the like of the operation and that inputs the operation signal to the controller 50.

The operation signal input to the remote place controller 50B is then input to the machine controller 50A of the hydraulic excavator 100 via the communication devices 61 and 62. The machine controller 50A of the hydraulic excavator 100 properly carries out signal processing, such as calculations, based on the incoming operation signal, to generate an instruction signal corresponding to the operation signal. The instruction signal is input to control valves and the like for actuating the boom cylinder 3a, the arm cylinder 4a, the bucket cylinder 5a, the slewing motor, the travelling motor, and the like. Thus, by operating the remote operation levers 32 and 32, the operator can cause the hydraulic excavator 100 to make various movements, which include, specifically, the slewing movement of the attachment, the rising and falling movement of the boom, the turning movement of the arm, the turning movement of the bucket, and the travelling movement of the lower travelling body 1.

The vibration detector 41 only needs to be a detector capable of detecting a vibration caused on the attachment 6. As such a detector, the vibration detector 41 is not limited in its specific configuration. One example of the vibration detector 41 is described as follows. The vibration detector 41 comprises, for example, an acceleration sensor 41X that detects a vibration component in an X direction, an acceleration sensor 41Y that detects a vibration component in a Y direction, and an acceleration sensor 41Z that detects a vibration component in a Z direction. These acceleration sensors 41X, 41Y, and 41Z are arranged such that their directions of detection of accelerations are perpendicular to each other. Data of vibration components detected respectively by the acceleration sensors 41X, 41Y, and 41Z includes pieces of data of vibration amplitudes, vibration frequencies, and the like.

The communication device 61 (transmission and reception device) is disposed on the hydraulic excavator 100 or in the vicinity thereof. Signals output from the camera 11, the vibration detector 41, and the like are input to the communication device 61 via the machine controller 50A. The communication device 61 is configured to transmit these signals to the communication device 62 (transmission and reception device) disposed in the remote place, and receive signals transmitted from the communication device 62.

The communication device 62 (transmission and reception device) is disposed in the remote place. The communication device 62 is configured to receive signals transmitted from the communication device 61 and input the signals to the remote place controller 50B. The communication device 62 is configured to receive signals output from the remote place controller 50B and transmit the signals to the communication device 61 disposed on the hydraulic excavator 100 or in the vicinity thereof.

According to this embodiment, the communication devices 61 and 62 are configured to transmit and receive signals to and from each other through wireless communication. However, the communication devices 61 and 62 are not limited thereto and may be configured to transmit and receive signals through wire communication.

The vibration generation device 71 is configured to generate a vibration that allows the operator to perceive vibration information through the operator's cutaneous sensation or the like. Examples of the vibration generation device 71 include a vibration generation device having a motor (not illustrated) and a weight attached to a shaft of the motor such that the barycenter of the weight is offset to the shaft. However, the vibration generation device 71 is not limited thereto. As shown in FIG. 2, for example, the vibration generation device 71 is disposed on at least one member selected out of the seat 34, the backrest 35, the headrest 36, the left and right armrests 37 and 37, the pair of remote operation levers 32 and 32, and a floor plate 38 (floor member).

The vibration generation device 71 may be configured to vibrate in directions corresponding to the three directions of the vibration components detected by the acceleration sensors 41X, 41Y, and 41Z of the vibration detector 41. Specifically, an example of the vibration generation device 71 is cited as a vibration generation device including a front-to-rear vibration generating part that generates a vibration in the front-to-rear direction, a left-to-right vibration generating part that generates a vibration in the left-to-right direction, and a vertical vibration generating part that generates a vibration in the vertical direction. The vibration generation device 71 of such a configuration can selectively generate a vibration in a direction corresponding to a direction of a maximum vibration component that will be described later, the direction being one of the front-to-rear direction, the left-to-right direction, and the vertical direction.

The sound generation device 72 is configured to generate a sound that allows the operator to perceive the vibration information through the operator's auditory sense. The sound generation device 72 has, for example, an alarm buzzer 72 or a speaker 72, as shown in FIG. 2.

The controller 50 is configured by, for example, a computer or the like. As shown in FIG. 3, according to this embodiment, the controller 50 includes the machine controller 50A disposed on the hydraulic excavator 100 and the remote place controller 50B disposed in the remote place. The remote place controller 50B has a coordinate system conversion section 52, a vibration determination section 53, and a transmission control section 54, as functional sections.

The coordinate system conversion section 52 is configured to convert vibration detection information, which is detected by the vibration detector 41 disposed on the bucket 5 of the attachment 6 and is defined on a first coordinate system with the bucket 5 as a reference, into vibration conversion information, which is defined on a second coordinate system with the operator's seat 31 in the remote place as a reference.

Figure 4:
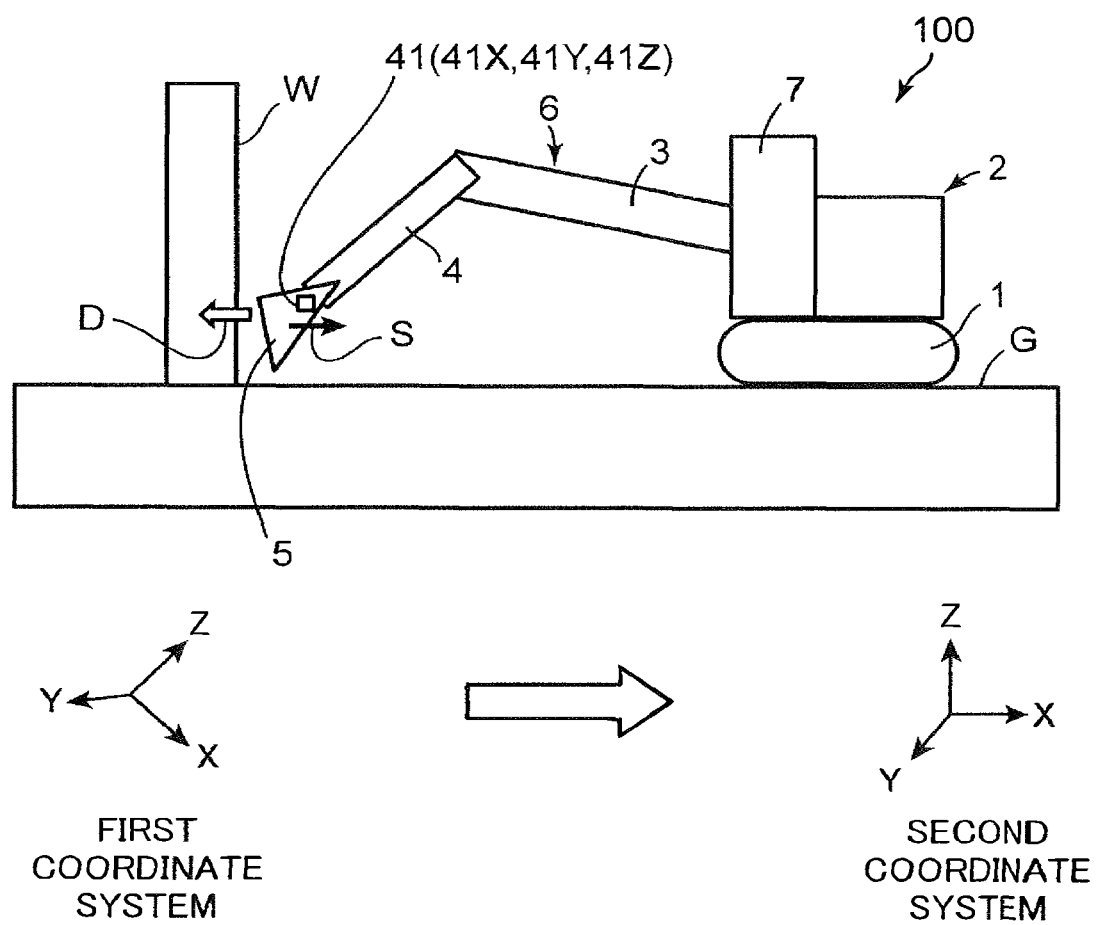
FIG. 4 is a schematic diagram showing an example of a movement of an attachment of the construction machine remotely operated by the remote operation device according to the embodiment, and a direction of a vibration caused on the attachment by the movement.

As shown in FIG. 4, in case that the vibration detector 41 is disposed on the bucket 5 of the attachment 6, each of the directions in the first coordinate system with the bucket 5 as a reference (each of directions of the X-axis, Y-axis, and Z-axis) changes depending on a movement of the bucket 5. For this reason, according to this embodiment, the vibration detection information defined on the first coordinate system is converted into the vibration conversion information defined on the second coordinate system.

The coordinate system conversion section 52 converts the coordinate system, for example, in the following manner. The coordinate system conversion section 52 of the machine controller 50A calculates an angle of the bucket 5 with respect to the cab 7, and converts the directions on a vibration detected by the vibration detector 41 disposed on the bucket 5 (the directions in the first coordinate system) into the directions on the vibration with respect to the cab 7. The converted directions on the vibration correspond to the directions in the coordinate system in the remote place. The angle of the bucket 5 with respect to the cab 7 can be calculated based on posture data acquired by various types of known posture detectors capable of detecting a posture of the attachment 6. A specific example of such a posture detector is as follows. The posture detector includes, for example, a boom angle sensor (not illustrated) capable of detecting an angle of the boom 3 (boom angle) with respect to the upper stewing body 2, an arm angle sensor (not illustrated) capable of detecting an angle of the arm 4 (arm angle) with respect to the boom 3, a bucket angle sensor (not illustrated) capable of detecting an angle of the bucket 5 (bucket angle) with respect to the arm 4, and a stewing angle sensor (not illustrated) capable of detecting an angle of the upper stewing body 2 (stewing angle) with respect to the lower travelling body 1. When the boom angle, the atm angle, the bucket angle, and the stewing angle are identified, the angle of the bucket 5 with respect to the cab 7 is identified based on information on those identified angles.

According to this embodiment, on the second coordinate system, the X-axis direction is defined as the front-to-rear direction, the Y-axis direction as the left-to-right direction, and the Z-axis direction as the vertical direction. However, definition of directions on the second coordinate system is not limited thereto.

The vibration determination section 53 compares amplitudes of three vibration components detected by the acceleration sensors 41X, 41Y, and 41Z of the vibration detector 41, and identifies a maximum vibration component largest in amplitude among these vibration components. The vibration determination section 53 also determines whether the amplitude of the maximum vibration component is equal to or larger than a preset amplitude threshold. The amplitude threshold can be set based on, for example, data that can be acquired by experiments, simulations, or the like, specifically, based on amplitude data on a vibration that is caused when the bucket 5 comes in contact with a wall surface W or a ground G.

Figure 5:
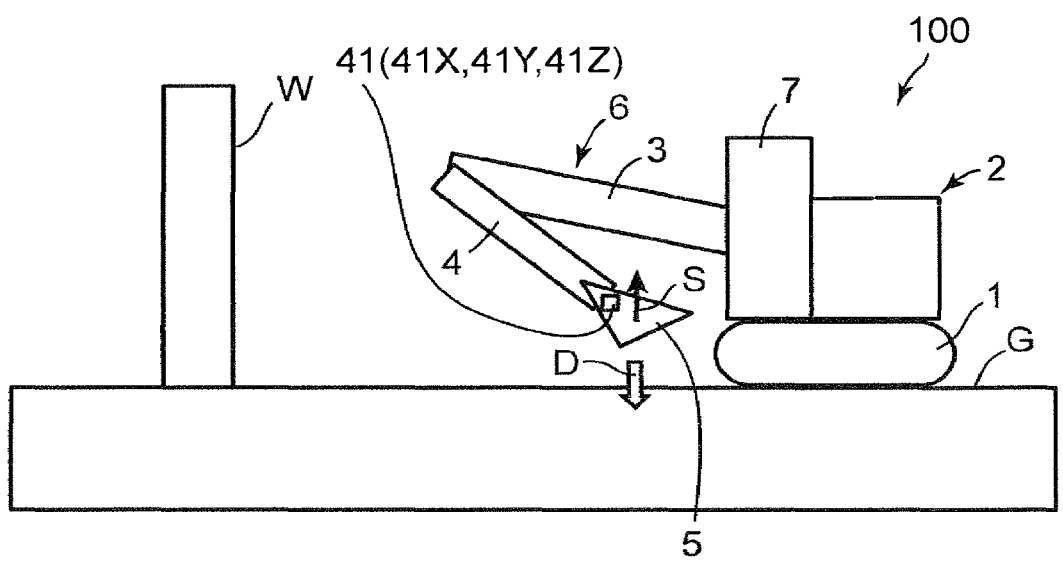
FIG. 5 is a schematic diagram showing another example of a movement of the attachment of the construction machine remotely operated by the remote operation device according to the embodiment, and a direction of a vibration caused on the attachment by the movement.
Figure 6:
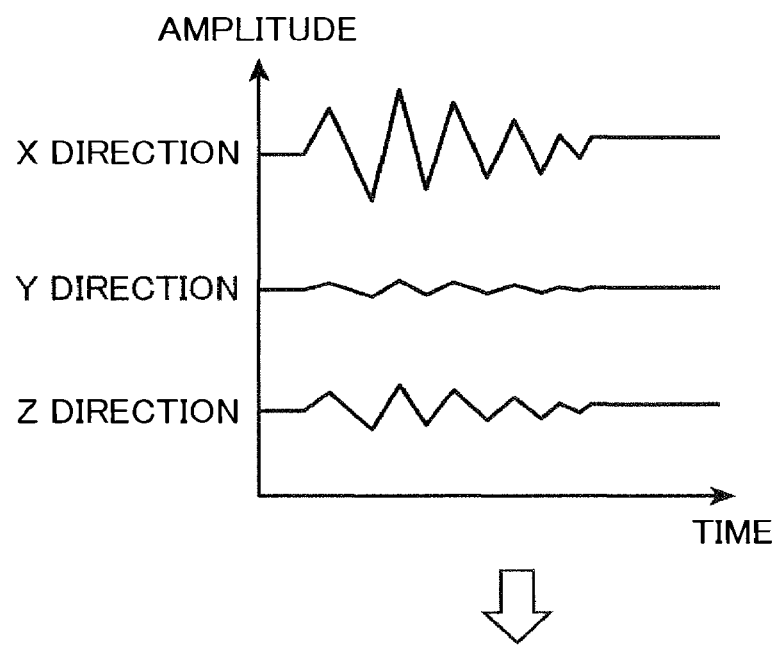
FIG. 6 is a schematic chart showing an example of respective waveforms of a vibration component in an X direction, a vibration component in a Y direction, and a vibration component in a Z direction that are detected by a vibration detector of the remote operation device according to the embodiment.
Figure 6:
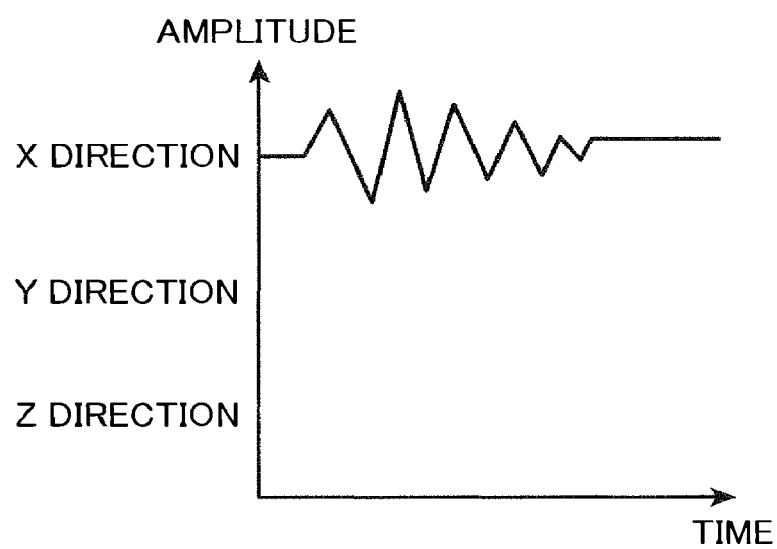

Specifically, for example, when the bucket 5 of the attachment 6 comes in contact with the wall surface W, the ground G, or the like, a vibration is caused on the bucket 5, as shown in FIGS. 4 and 5. The vibration of the bucket 5 is, for example, detected as three vibration components, by the acceleration sensors 41X, 41Y, and 41Z of the vibration detector 41, as shown in FIG. 6. These three vibration components are a vibration component in the X direction, a vibration component in the Y direction, and a vibration component in the Z direction. Signals indicative of the vibration components detected by the vibration detector 41 are input to the remote place controller 50B via the communication devices 61 and 62. Based on the incoming signals, the vibration determination section 53 identifies the maximum vibration component largest in amplitude (the vibration component in the X direction in the example of FIG. 6) among the vibration component in the X direction, the vibration component in the Y direction, and the vibration component in the Z direction. The vibration determination section 53 then determines whether the amplitude of the vibration component in the X direction, which is the maximum vibration component, is equal to or larger than the amplitude threshold.

The transmission control section 54 is configured to control operations of the transmission devices 71, 72 to allow the vibration information to be transmitted to the operator only when a preset vibration determination condition is met. The vibration determination condition is set as a condition based on which the transmission control section 54 determines whether or not to transmit the vibration information on the vibration of the bucket 5, the vibration being detected by the vibration detector 41, to the operator in the remote place.

The vibration determination condition includes at least a condition (amplitude condition) that the amplitude of the maximum vibration component is equal to or larger than the preset amplitude threshold.

The vibration determination condition may also include a preset frequency condition on a frequency of the vibration of the bucket 5. In this case, the frequency condition includes a condition that whether the frequency of the vibration of the bucket 5 is within a preset frequency range. Data of the vibration components detected respectively by the acceleration sensors 41X, 41Y, and 41Z includes data on vibration frequencies. Therefore, the controller 50 can determine whether the frequency condition is met, based on data on frequencies of the vibration components.

The vibration determination condition may also include a condition (operation condition) that the attachment operation has been applied to the remote operation lever 32. The controller 50 determines whether the operation condition included in the vibration determination condition is met, in the following manner. As described above, when the operator carries out an operation to the remote operation lever 32, the remote operation lever 32 generates an operation signal corresponding to a state of the remote operation lever 32 (operation state), the state being determined according to an operation amount, an operation direction, and the like of the operation, and inputs the operation signal to the remote place controller 50B. Therefore, the transmission control section 54 can determine whether the attachment operation has been applied to the remote operation lever 32, based on the operation signal input to the remote place controller 50B. The transmission control section 54 may determine that the attachment operation has been applied to the remote operation lever 32 when finding the operation amount of the operation applied to the remote operation lever 32 to be equal to or larger than a preset reference value, and may determine that the attachment operation has not been applied to the remote operation lever 32 when finding the operation amount to be smaller than the reference value. Determination on whether the operation condition is met may be made by the machine controller 50A.

As described above, the vibration determination condition may include only the amplitude condition. Nevertheless, the vibration determination condition may further include at least one of the frequency condition and the operation condition, in addition to the amplitude condition. Further, the vibration determination condition may also include a condition different from the frequency condition and the operation condition, in addition to the amplitude condition.

Figure 7:
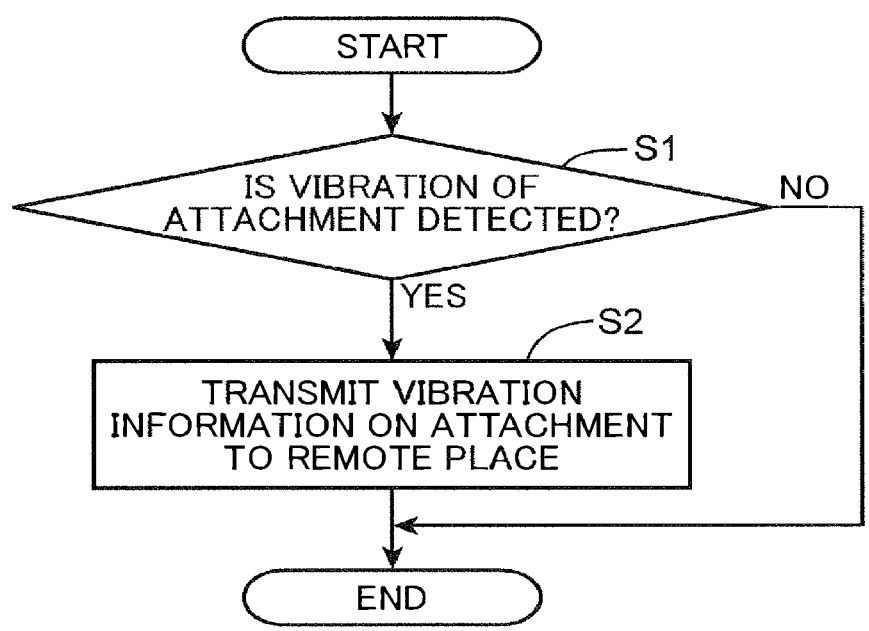
FIG. 7 is a flowchart showing an example of a calculation control processing carried out by a machine controller disposed on the construction machine, the machine controller being included in a controller of the remote operation device.

A calculation control processing carried out by the controller 50 of the remote operation device 101 according to this embodiment will then be described with reference to flowcharts shown in FIGS. 7 and 8. FIG. 7 is a flowchart showing an example of a calculation control processing carried out by the machine controller 50A disposed on the hydraulic excavator 100, the machine controller 50A being included in the controller 50 of the remote operation device 101. FIG. 8 is a flowchart showing an example of a calculation control processing carried out by the remote place controller 50B disposed in the remote place, the remote place controller 50B being included in the controller 50 of the remote operation device 101.

As shown in FIG. 7, when the hydraulic excavator 100 starts its work, the machine controller 50A determines whether a vibration of the bucket 5 of the attachment 6 has been detected, based on information on the vibration of the bucket 5, the information being sent from the vibration detector 41 to the machine controller 50A (step S1). When determining that the vibration of the bucket 5 has been detected (YES in step S1), the machine controller 50A transmits information on the bucket 5, such as vibration information and movement information on the bucket 5 of the attachment 6, to the remote place controller 50B via the communication devices 61 and 62 (step S2). The information on the bucket 5 includes information on the vibration of the bucket 5, the vibration being detected by the vibration detector 41 (vibration detection information defined on the first coordinate system).

Subsequently, as shown in FIG. 8, the remote place controller 50B determines whether it has received the information on the bucket 5, such as the vibration information (step S11). When the information on the bucket 5 has been input to the remote place controller 50B (YES in step S11), the coordinate system conversion section 52 converts vibration detection information, which is detected by the vibration detector 41 disposed on the bucket 5 and is defined on the first coordinate system, into vibration conversion information, which is defined on the second coordinate system with the operator's seat 31 in the remote place as a reference (step S12).

Subsequently, the vibration determination section 53 identifies a maximum vibration component largest in amplitude among vibration components in three directions (the X direction, Y direction, and Z direction) that are detected by the acceleration sensors 41X, 41Y, and 41Z of the vibration detector 41, based on information on these vibration components (step S13). In the specific example of FIG. 6, the maximum vibration component is the vibration component in the X direction. The vibration determination section 53 then determines whether the amplitude of the maximum vibration component is equal to or larger than a preset amplitude threshold (step S14).

When determining that the amplitude of the maximum vibration component is equal to or larger than the amplitude threshold (YES in step S14), the vibration determination section 53 determines whether a frequency of the maximum vibration component is within a preset frequency range (step S15). When the frequency of the maximum vibration component is within the preset frequency range (YES in step S15), the transmission control section 54 controls at least one of the vibration generation device 71 and the sound generation device 72 so that the vibration information is transmitted to the operator (step S16).

The above frequency range may be set as a frequency range equal to or larger than a preset threshold or as a frequency range between a preset lower limit value and a preset upper limit value. The frequency range is thus set in the above manner. Including such a frequency condition in the vibration determination condition prevents a case where a vibration with a frequency belonging to a specific frequency range (e.g. a frequency range associated with a frequency of a vibration caused by the sudden stop) is transmitted to the operator. As a result, a deterioration in the operability of the attachment is suppressed. The transmission control section 54 may control at least one of the vibration generation device 71 and the sound generation device 72 so that the vibration information is transmitted to the operator when the frequency of the maximum vibration component is out of the preset frequency range.

According to this embodiment, the vibration generation device 71 is configured to be capable of vibrating in a plurality of directions. In such a case, the transmission control section 54 can control the vibration generation device 71 so as to cause it to selectively generate a vibration in a direction corresponding to a direction of the maximum vibration component. Specifically, a case is assumed where on the second coordinate system, the X direction is defined as the front-to-rear direction, the Y direction as the left-to-right direction, and the Z direction as the vertical direction, and this case will be described exemplarily.

Vibration detection information detected by the acceleration sensors 41X, 41Y, and 41Z is, for example, data defined on the first coordinate system shown in FIG. 4. As described above, this vibration detection information is converted by the coordinate system conversion section 52 into, for example, coordinate system conversion information defined on the second coordinate system shown in FIG. 4. The coordinate system conversion information resulting from the conversion includes, for example, data of the three vibration components shown in FIG. 6. In this case, when the vibration determination section 53 determines that the vibration component in the X direction is the maximum vibration component and that the amplitude of the maximum vibration component is equal to or larger than the amplitude threshold, the transmission control section 54 controls the vibration generation device 71 so as to cause it to selectively generate only the vibration in the X direction corresponding to the direction of the maximum vibration component, that is, the vibration in the front-to-rear direction. As a result, the operator is able to specifically understand a vibration actually caused on the bucket 5.

In FIG. 8, the order of processes carried out in steps S14 and S15 in sequence may not be limited to the order shown in FIG. 8 and may be switched. In FIG. 8, step S15 may be omitted from the flowchart.

In this embodiment, the vibration determination condition may include a different condition set before step S16 of the flowchart of FIG. 8.

Specifically, for example, the vibration determination condition may include a condition (operation condition) that the attachment operation has been applied to the remote operation lever 32. In this case, an operation signal from each of the remote operation levers 32 and 32 is input to the controller 50 (the machine controller 50A or the remote place controller 50B). The controller 50 determines whether the attachment operation has been applied to each of the remote operation levers 32 and 32. In another configuration, a specific operation included in the attachment operations may be set in advance and stored in a memory (not illustrated) of the controller 50, in which case the vibration determination condition includes a condition (specific operation condition) that the specific operation has been applied to the remote operation lever 32. Specifically, examples of the specific operation include the arm turning operation, which is one of a plurality of operations included in the attachment operations. More specifically, examples of the specific operation include an arm pushing operation of causing the arm 4 to move forward, which is an example of the arm turning operation. The arm pushing operation corresponds to an operation of moving the bucket 5 in a forward direction D to bring the bucket 5 into contact with the wall surface W of the building, as shown in FIG. 4, or to an operation of moving the bucket 5 in a downward direction D to bring the bucket 5 into contact with earth and sand of the ground, as shown in FIG. 5. By including the condition that the specific operation has been applied to the remote operation levers 32 and 32, in the vibration determination condition, a machine vibration generated as a vibration having a higher possibility of the bucket 5 having come in contact with a different object, such as a work target, can be selectively transmitted to the operator.

According to the remote operation device 101 of this embodiment described above, the vibration determination condition includes the condition (amplitude condition) that the amplitude of the maximum vibration component is equal to or larger than the amplitude threshold, and only when the vibration determination condition is met, transmitting the vibration information to the operator is allowed. Therefore, this prevents a case where the vibration information is transmitted to the operator when the bucket 5 is not in contact with a different object, such as a work target. As a result, a vibration having a high possibility of the bucket 5 corning in contact with the different object can be selectively transmitted to the operator. This allows the operator to carry out the attachment operation more exactly.

Determination on the amplitude condition, that is, determination on the amplitude condition that the amplitude of the maximum vibration component largest in amplitude among the plurality of vibration components detected by the vibration detector 41 is equal to or larger than the amplitude threshold can be made by, for example, comparing detection values from the plurality of acceleration sensors relatively with each other and with the amplitude threshold, which requires a relatively simple configuration and simple control. Complication of the structure and control of the remote operation device 101, therefore, can be suppressed.

According to this embodiment, the vibration detector 41 is made up of the acceleration sensors 41X, 41Y, and 41Z, which can detect vibration components in three directions perpendicular to each other (a first direction, a second direction, and a third direction), respectively. For example, by defining the first direction as the front-to-rear direction, the second direction as the left-to-right direction, and the third direction as the vertical direction, therefore, various vibration components classified in the above manner, that is, the upward vibration component, the rearward vibration component, the leftward vibration component, and the rightward vibration component are detected through highly sensitive detection performance.

The vibration determination condition may further include a condition that the attachment operation has been applied to the remote operation lever 32. In such a case, a vibration having a high possibility of the attachment coming in contact with a different object, such as a work target, can be selectively transmitted to the operator in the remote place.

[Modifications]

The present invention is not limited to the above-described embodiment. The present invention includes, for example, the following aspects.

(A) Construction Machine

The remote operation device is applied not only to the hydraulic excavator 100 described exemplarily in the embodiment but can also be applied widely to other construction machines, such as a crane and a bulldozer.

(B) Tip Attachment

In the remote operation device, the tip attachment is not limited to the bucket 5 described exemplarily in the embodiment. The tip attachment may be, for example, a grapple that grasps and carries scraps in a scrapyard or the like, a crusher (disintegrator) for carrying out demolition work of demolishing a concrete building or the like, a breaker used to drill bedrocks, break rocks into pieces, and crush concrete, or a fork that holds an object to be transferred.

(C) Transmission Device

The transmission device only needs to be a device capable of transmitting vibration information on the vibration of the attachment to the operator in the remote place. As such a device, the transmission device is not limited to the vibration generation device 71 and the sound generation device 72 that are described exemplarily in the embodiment, but may be, for example, a light generation device, a vibration information display device, or the like. The light generation device has, for example, an indicator lamp, a rotary lamp, and a signal lamp (which are not illustrated). The vibration information display device has, for example, a display (not illustrated) that displays characters, figures, and the like that allow the operator to visually recognize the vibration information represented by the characters and figures.

(D) Vibration Detector

The vibration detector only needs to be capable of detecting the vibration of the attachment. As such a detector, while the vibration detector disposed on the bucket 5 making up the tip of the attachment 6 is described exemplarily in the embodiment, the vibration detector may not be disposed on the bucket 5. It may be disposed on the arm 4, the boom 3, or the upper slewing body 2. A plurality of vibration detectors may be disposed on a plurality of parts respectively.

(E) Functions of Controller 50

The coordinate system conversion section 52, the vibration determination section 53, and the transmission control section 54 may be included not in the remote place controller 50B but in the machine controller 50A. The controller 50 may be configured by only one of the machine controller 50A and the remote place controller 50B.

(Summary of Embodiment)

Technical features of this embodiment can be summarized as follows.

To solve the problems mentioned above, the inventors have focused on a fact that when the attachment comes in contact with a different object during work using the construction machine, such as excavation work and demolition work, it tends to cause a vibration with a distinctive feature that the amplitude of a vibration component in a specific direction is significantly larger than the amplitude of a vibration component in a different direction. In other words, in a vibration caused on the attachment, the size of the amplitude of a maximum vibration component largest in amplitude among a plurality of vibration components in a plurality of directions different from each other serves as important criteria for determining whether the attachment has come in contact with the different object. Therefore, a condition on the size of the amplitude of the maximum vibration component extracted from the plurality of vibration components is included in a vibration determination condition for determining whether the vibration caused on the attachment is a vibration caused by the attachment's coming in contact with the different object. This makes it possible to determine whether the vibration caused on the attachment is a vibration having a high possibility of the attachment coming in contact with the different object, and when it is determined that such a vibration has been caused, makes it possible also to selectively transmit the vibration to an operator in a remote place.

The remote operation device for the construction machine has been devised from such a point of view as described above. The remote operation device is a device for remotely operating a construction machine having an attachment from a remote place distant from the construction machine. The remote operation device includes: a vibration detector configured to detect a plurality of vibration components in a plurality of directions different from each other, the vibration components being included in a vibration caused on the attachment; a transmission device that transmits vibration information on the vibration of the attachment to an operator in a remote place; and a transmission control section that controls an operation of the transmission device. A vibration determination condition for determining whether the vibration of the attachment is a vibration caused by the attachment's coming in contact with a different object is set in advance. The vibration determination condition includes a condition that an amplitude of a maximum vibration component largest in amplitude among the plurality of vibration components detected by the vibration detector is equal to or larger than a preset amplitude threshold. The transmission control section controls an operation of the transmission device to allow the vibration information to be transmitted to the operator only when the vibration determination condition is met.

According to the remote operation device, the vibration determination condition includes the condition (amplitude condition) that the amplitude of the maximum vibration component is equal to or larger than the amplitude threshold, and only when the vibration determination condition is met, transmitting the vibration information to the operator is allowed. Specifically, according to the remote operation device, the vibration caused on the attachment is filtered, using the amplitude condition, to allow extraction of a vibration having a high possibility of the attachment coining in contact with a different object. When the vibration determination condition is not met, transmission of the vibration information to the operator is suppressed. Thus, according to the remote operation device, a vibration having a high possibility of the attachment coming in contact with the different object can be selectively transmitted to the operator.

Specifically, it is preferable that in the remote operation device for the construction machine, the plurality of directions include three directions perpendicular to each other. For example, when a work target during the excavation work is the ground on a lower level in front of the construction machine, it is assumed that the attachment moves downward to come in contact with earth and sand making up the ground. At this time, a vibration caused on the attachment mainly includes a lot of upward vibration components. When a work target during the demolition work or excavation work is a wall surface of a building in front of the construction machine, on the other hand, it is assumed that the attachment moves forward to come in contact with the wall surface. At this time, a vibration caused on the attachment mainly includes a lot of rearward vibration components. In another case where the attachment makes a stewing movement as a result of a stewing movement made by the upper stewing body and comes in contact with, for example, the wall surface of the building, the attachment is moving rightward or leftward in most cases. A vibration caused on the attachment, therefore, mainly includes a lot of leftward or rightward vibration components. Vibrations caused on the attachment by its various movements are roughly classified in the above manner. In this aspect in which the vibration detector can detect three vibration components in the three directions (the first direction, the second direction, and the third direction) perpendicular to each other, for example, by defining the first direction as the front-to-rear direction, the second direction as the left-to-right direction, and the third direction as the vertical direction, various vibration components classified in the above manner, that is, the upward vibration component, the rearward vibration component, the leftward vibration component, and the rightward vibration component are highly sensitively detected.

The remote operation device for the construction machine may further include a remote operation lever to which an attachment operation is applied by the operator in the remote place, the attachment operation being an operation for causing the attachment to move, in which the vibration determination condition may further include a condition that the attachment operation has been applied to the remote operation lever. When the attachment comes in contact with a different object, such as a work target, during work using the construction machine, such as the excavation work and the demolition work, the attachment operation for causing the attachment to move has been applied to the remote operation lever in many cases. This means that the attachment operation having been applied to the remote operation lever serves as important criteria for determining whether the attachment has come in contact with the different object. In this aspect, therefore, a condition that the operator has carried out the attachment operation is included in the vibration determination condition. This makes it possible to determine whether the vibration caused on the attachment is a vibration having a high possibility of the attachment coming in contact with the different object due to the attachment operation, and when it is determined that such a vibration has been caused, makes it possible also to selectively transmit the vibration to the operator in the remote place.

It is preferable that in the remote operation device for the construction machine, the vibration detector be disposed on the attachment and the vibration of the attachment, the vibration being detected by the vibration detector, be defined on a first coordinate system with the attachment as a reference, and that the remote operation device further include an operator's seat in which an operator sits in the remote place, and a coordinate system conversion section that converts vibration detection information detected by the vibration detector and defined on the first coordinate system, into vibration conversion information defined on a second coordinate system with the operator's seat in the remote place as a reference. In this aspect in which the vibration detector is disposed on the attachment, each of the directions in the first coordinate system with the attachment as a reference changes depending on a movement of the attachment. For this reason, in this aspect, the vibration detection information defined on the first coordinate system is converted into the vibration conversion information defined on the second coordinate system. This makes it possible that plural pieces of information on the vibration of the attachment, the plural pieces of information being acquired consecutively by the vibration detector, that is, the plural pieces of information defined on the first coordinate system that changes depending on the movement of the attachment is used comparatively in a similar coordinate system (fixed coordinate system), i.e., the second coordinate system with the operator's seat as a reference.

According to the remote operation device for the construction machine, the vibration determination condition may further include a preset frequency condition on a frequency of the vibration of the attachment, and the frequency condition may include a condition of determining whether the frequency of the vibration of the attachment is included in a preset frequency range. For example, when the attachment moving in the air stops suddenly without coming in contact with a different object, it is assumed that a vibration is caused on the attachment due to impact resulting from sudden stoppage of the attachment. However, it should be noted that the frequency of a vibration that is caused on the attachment due to such sudden stoppage is different from the frequency of a vibration that is caused on the attachment when the attachment comes in contact with the different object. Therefore, the frequency of the vibration caused on the attachment may serve as criteria for determining whether the attachment has come in contact with the different object. Thus, in this aspect, the vibration determination condition includes the frequency condition. This makes it possible to extract a vibration having a higher possibility of the attachment coming in contact with the different object, and makes it possible also to selectively transmit the extracted vibration to the operator.

In the remote operation device for the construction machine, the transmission device may include a vibration generation device configured to vibrate in directions corresponding to the plurality of directions, and the transmission control section may control the vibration generation device to cause the vibration generation device to vibrate in a direction corresponding to a direction of the maximum vibration component. In this aspect, when a vibration of the attachment having come in contact with a different object includes vibration components among which, for example, a vibration component in the rearward direction (front-to-rear direction) is the largest in amplitude, the vibration component in the rearward direction (front-to-rear direction) is transmitted to the operator in the remote place. As a result, the operator is able to specifically understand a vibration actually caused on the attachment.

As described above, when remotely operating the construction machine, the remote operation device is capable of determining whether a vibration caused on the attachment is a vibration having a high possibility of the attachment coming in contact with a different object, and when determining that such a vibration has been caused, selectively transmitting the vibration to the operator.

The invention claimed is:

1. A remote operation device for remotely operating a construction machine having an attachment from a remote place distant from the construction machine, the remote operation device comprising:
    a vibration detector configured to detect a plurality of vibration components in a plurality of directions different from each other, the vibration components being included in a vibration caused on the attachment;
    a transmission device that transmits vibration information on the vibration of the attachment to an operator in the remote place; and
    a transmission control section that controls an operation of the transmission device,
    wherein a vibration determination condition for determining whether the vibration of the attachment is a vibration caused by the attachment's coming in contact with a different object is set in advance,
    the vibration determination condition includes a condition that an amplitude of a maximum vibration component largest in amplitude among the plurality of vibration components detected by the vibration detector is equal to or larger than a preset amplitude threshold,
    the transmission control section controls an operation of the transmission device to allow the vibration information to be transmitted to the operator only when the vibration determination condition is met, and
    the plurality of directions include three directions perpendicular to each other.

2. The remote operation device for the construction machine according to claim 1, wherein the vibration determination condition further include a frequency condition preset on a frequency of the vibration of the attachment, and the frequency condition includes a condition of determining whether the frequency of the vibration of the attachment is included in a preset frequency range.

3. The remote operation device for the construction machine according to claim 1, wherein the transmission device include a vibration generation device configured to vibrate in directions corresponding to the plurality of directions, and the transmission control section controls the vibration generation device to cause the vibration generation device to vibrate in a direction corresponding to a direction of the maximum vibration component.

4. A remote operation device for remotely operating a construction machine having an attachment from a remote place distant from the construction machine, the remote operation device comprising:

a vibration detector configured to detect a plurality of vibration components in a plurality of directions different from each other, the vibration components being included in a vibration caused on the attachment;

a transmission device that transmits vibration information on the vibration of the attachment to an operator in the remote place; and a transmission control section that controls an operation of the transmission device, wherein a vibration determination condition for determining whether the vibration of the attachment is a vibration caused by the attachment's coming in contact with a different object is set in advance, the vibration determination condition includes a condition that an amplitude of a maximum vibration component largest in amplitude among the plurality of vibration components detected by the vibration detector is equal to or larger than a preset amplitude threshold, the transmission control section controls an operation of the transmission device to allow the vibration information to be transmitted to the operator only when the vibration determination condition is met, the remote operation device further comprises a remote operation lever to which an attachment operation is applied by the operator in the remote place, the attachment operation being an operation for causing the attachment to move, wherein the vibration determination condition further includes a condition that the attachment operation has been applied to the remote operation lever.

5. A remote operation device for remotely operating a construction machine having an attachment from a remote place distant from the construction machine, the remote operation device comprising:

a vibration detector configured to detect a plurality of vibration components in a plurality of directions different from each other, the vibration components being included in a vibration caused on the attachment;

a transmission device that transmits vibration information on the vibration of the attachment to an operator in the remote place; and a transmission control section that controls an operation of the transmission device, wherein a vibration determination condition for determining whether the vibration of the attachment is a vibration caused by the attachment's coming in contact with a different object is set in advance, the vibration determination condition includes a condition that an amplitude of a maximum vibration component largest in amplitude among the plurality of vibration components detected by the vibration detector is equal to or larger than a preset amplitude threshold, the transmission control section controls an operation of the transmission device to allow the vibration information to be transmitted to the operator only when the vibration determination condition is met, the vibration detector is disposed on the attachment and the vibration of the attachment, the vibration being detected by the vibration detector, is defined on a first coordinate system with the attachment as a reference, and the remote operation device further comprises:

an operator's seat in which an operator sits in the remote place; and a coordinate system conversion section that converts vibration detection information detected by the vibration detector and defined on the first coordinate system, into vibration conversion information defined on a second coordinate system with the operator's seat in the remote place as a reference.

* * * * *